(12) United States Patent
Hazlehurst et al.

(10) Patent No.: US 7,856,386 B2
(45) Date of Patent: *Dec. 21, 2010

(54) HOST EXCHANGE IN BILL PAYING SERVICES

(75) Inventors: Peter Alexander Hazlehurst, Foster City, CA (US); Cindy Alvarez, Redwood Shores, CA (US)

(73) Assignee: Yodlee, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/561,586

(22) Filed: Sep. 17, 2009

(65) Prior Publication Data

US 2010/0004990 A1 Jan. 7, 2010

Related U.S. Application Data

(63) Continuation of application No. 11/851,131, filed on Sep. 6, 2007, now Pat. No. 7,606,752.

(60) Provisional application No. 60/843,450, filed on Sep. 7, 2006.

(51) Int. Cl.
G06Q 40/00 (2006.01)
G06F 7/00 (2006.01)

(52) U.S. Cl. .......................... 705/35; 707/776
(58) Field of Classification Search .................. 705/35
See application file for complete search history.

(56) References Cited

U.S. PATENT DOCUMENTS

| | | | |
|---|---|---|---|
| 4,727,243 A | 2/1988 | Savar | |
| 4,987,538 A | 1/1991 | Johnson et al. | |
| 5,220,501 A | 6/1993 | Lawlor et al. | |
| 5,237,499 A | 8/1993 | Garback | |
| 5,318,007 A | 6/1994 | Afshar | |
| 5,340,537 A | 8/1994 | Barrett | |
| 5,347,632 A | 9/1994 | Filepp et al. | |
| 5,423,033 A | 6/1995 | Yuen | |

(Continued)

FOREIGN PATENT DOCUMENTS

EP 0747843 12/1996

(Continued)

OTHER PUBLICATIONS

Account aggregation: Independent Study University of Rhode Island, 2002.*

(Continued)

Primary Examiner—Thomas Dixon
Assistant Examiner—William Rankins
(74) Attorney, Agent, or Firm—Donald R. Boys; Central Coast Patent Agency, Inc.

(57) ABSTRACT

An account exchange system is provided by a data aggregation service enabled for gathering data for a subscriber from a data repository of a first financial institution, using account exchange software operating on a server coupled to the data aggregation service. Initiated by a subscriber the account exchange software causes an account to be terminated at the first financial institution and a new account to be opened at a second financial institution, using data from the first financial institution, and processing the data to be compatible with data requirements at the second financial institution.

22 Claims, 4 Drawing Sheets

U.S. PATENT DOCUMENTS

| | | |
|---|---|---|
| 5,446,891 A | 8/1995 | Kaplan et al. |
| 5,459,306 A | 10/1995 | Stein et al. |
| 5,481,672 A | 1/1996 | Okuno et al. |
| 5,483,445 A | 1/1996 | Pickering |
| 5,537,314 A | 7/1996 | Kanter |
| 5,590,196 A | 12/1996 | Moreau |
| 5,611,048 A | 3/1997 | Jacobs et al. |
| 5,613,012 A | 3/1997 | Hoffman et al. |
| 5,619,648 A | 4/1997 | Canale et al. |
| 5,619,716 A | 4/1997 | Nonaka et al. |
| 5,634,127 A | 5/1997 | Cloud et al. |
| 5,640,577 A | 6/1997 | Scharmer |
| 5,644,576 A | 7/1997 | Bauchot et al. |
| 5,649,118 A | 7/1997 | Carlisle et al. |
| 5,649,186 A | 7/1997 | Ferguson |
| 5,655,089 A | 8/1997 | Bucci |
| 5,696,965 A | 12/1997 | Dedrick |
| 5,699,528 A | 12/1997 | Hogan |
| 5,701,451 A | 12/1997 | Rogers et al. |
| 5,706,442 A | 1/1998 | Anderson et al. |
| 5,708,825 A | 1/1998 | Sotomayor |
| 5,710,887 A | 1/1998 | Chellish et al. |
| 5,710,918 A | 1/1998 | Lagarde et al. |
| 5,712,979 A | 1/1998 | Graber et al. |
| 5,717,923 A | 2/1998 | Dedrick |
| 5,721,908 A | 2/1998 | Lagarde et al. |
| 5,724,567 A | 3/1998 | Rose et al. |
| 5,724,595 A | 3/1998 | Gentner |
| 5,727,156 A | 3/1998 | Herr-Hoyman et al. |
| 5,732,074 A | 3/1998 | Spaur et al. |
| 5,740,365 A | 4/1998 | Pfeiffer et al. |
| 5,740,549 A | 4/1998 | Reilly et al. |
| 5,745,754 A | 4/1998 | Lagarde et al. |
| 5,745,884 A | 4/1998 | Carnegie et al. |
| 5,752,246 A | 5/1998 | Rogers et al. |
| 5,758,577 A | 6/1998 | Kleewin et al. |
| 5,768,521 A | 6/1998 | Dedrick |
| 5,774,123 A | 6/1998 | Matson |
| 5,778,367 A | 7/1998 | Wesinger, Jr. et al. |
| 5,778,368 A | 7/1998 | Hogan et al. |
| 5,787,425 A | 7/1998 | Bigus |
| 5,790,789 A | 8/1998 | Suarez |
| 5,790,793 A | 8/1998 | Higley |
| 5,793,964 A | 8/1998 | Rogers et al. |
| 5,793,966 A | 8/1998 | Amstein et al. |
| 5,794,233 A | 8/1998 | Rubinstein |
| 5,796,945 A | 8/1998 | Tarabella |
| 5,799,151 A | 8/1998 | Hoffer |
| 5,805,719 A | 9/1998 | Pare, Jr. et al. |
| 5,812,769 A | 9/1998 | Graber et al. |
| 5,813,007 A | 9/1998 | Nielsen |
| 5,815,665 A | 9/1998 | Teper et al. |
| 5,818,935 A | 10/1998 | Maa |
| 5,819,284 A | 10/1998 | Farber et al. |
| 5,825,884 A | 10/1998 | Zdepski et al. |
| 5,828,839 A | 10/1998 | Moncreiff |
| 5,832,474 A | 11/1998 | Lopresti et al. |
| 5,832,494 A | 11/1998 | Egger et al. |
| 5,835,724 A | 11/1998 | Smith et al. |
| 5,838,910 A | 11/1998 | Domenikos et al. |
| 5,838,916 A | 11/1998 | Domenikos et al. |
| 5,838,918 A | 11/1998 | Prager et al. |
| 5,842,185 A | 11/1998 | Chancey et al. |
| 5,845,073 A | 12/1998 | Carlin et al. |
| 5,848,396 A | 12/1998 | Gerace |
| 5,854,897 A | 12/1998 | Radziewicz et al. |
| 5,855,015 A | 12/1998 | Shoham |
| 5,855,020 A | 12/1998 | Kirsch |
| 5,860,068 A | 1/1999 | Cook |
| 5,860,073 A | 1/1999 | Ferrel et al. |
| 5,862,325 A | 1/1999 | Reed et al. |
| 5,870,546 A | 2/1999 | Kirsch |
| 5,870,552 A | 2/1999 | Dozier et al. |
| 5,875,296 A | 2/1999 | Shi et al. |
| 5,875,437 A | 2/1999 | Atkins |
| 5,878,215 A | 3/1999 | Kling et al. |
| 5,878,219 A | 3/1999 | Vance, Jr. et al. |
| 5,878,408 A | 3/1999 | Van Huben et al. |
| 5,884,033 A | 3/1999 | Duvall et al. |
| 5,884,035 A | 3/1999 | Butman et al. |
| 5,884,045 A | 3/1999 | Kurihara |
| 5,887,133 A | 3/1999 | Brown et al. |
| 5,890,140 A | 3/1999 | Clark et al. |
| 5,890,152 A | 3/1999 | Rapaport et al. |
| 5,892,900 A | 4/1999 | Ginter et al. |
| 5,892,909 A | 4/1999 | Grasso et al. |
| 5,893,075 A | 4/1999 | Plainfield et al. |
| 5,893,091 A | 4/1999 | Hunt et al. |
| 5,893,128 A | 4/1999 | Nauckhoff |
| 5,894,554 A | 4/1999 | Lowery et al. |
| 5,895,468 A | 4/1999 | Whitmyer, Jr. |
| 5,895,838 A | 4/1999 | Harjunmaa et al. |
| 5,897,620 A | 4/1999 | Walker et al. |
| 5,897,622 A | 4/1999 | Blinn et al. |
| 5,898,836 A | 4/1999 | Freivald et al. |
| 5,901,287 A | 5/1999 | Bull et al. |
| 5,903,881 A | 5/1999 | Schrader et al. |
| 5,905,736 A | 5/1999 | Ronen et al. |
| 5,905,865 A | 5/1999 | Palmer et al. |
| 5,907,837 A | 5/1999 | Ferrel et al. |
| 5,907,838 A | 5/1999 | Miyasaka et al. |
| 5,908,469 A | 6/1999 | Botz et al. |
| 5,913,202 A | 6/1999 | Motoyama |
| 5,913,214 A | 6/1999 | Madnick et al. |
| 5,918,019 A | 6/1999 | Valencia |
| 5,918,214 A | 6/1999 | Perkowski |
| 5,920,848 A | 7/1999 | Schutzer et al. |
| 5,923,736 A | 7/1999 | Shachar |
| 5,924,090 A | 7/1999 | Krellenstein |
| 5,926,798 A | 7/1999 | Carter |
| 5,930,777 A | 7/1999 | Barber |
| 5,931,907 A | 8/1999 | Davies et al. |
| 5,931,947 A | 8/1999 | Burns et al. |
| 5,933,604 A | 8/1999 | Inakoshi |
| 5,933,811 A | 8/1999 | Angles et al. |
| 5,933,816 A | 8/1999 | Zeanah et al. |
| 5,937,168 A | 8/1999 | Anderson et al. |
| 5,937,392 A | 8/1999 | Alberts |
| 5,943,424 A | 8/1999 | Berger et al. |
| 5,948,040 A | 9/1999 | DeLorme et al. |
| 5,949,326 A | 9/1999 | Wicks et al. |
| 5,951,637 A | 9/1999 | Kuzma |
| 5,951,642 A | 9/1999 | Onoe et al. |
| 5,956,709 A | 9/1999 | Xue |
| 5,958,008 A | 9/1999 | Pogrebisky et al. |
| 5,960,200 A | 9/1999 | Eager et al. |
| 5,961,593 A | 10/1999 | Gabber et al. |
| 5,961,601 A | 10/1999 | Iyengar |
| 5,963,915 A | 10/1999 | Kirsch |
| 5,963,924 A | 10/1999 | Williams et al. |
| 5,963,925 A | 10/1999 | Kolling et al. |
| 5,963,949 A | 10/1999 | Gupta et al. |
| 5,963,952 A | 10/1999 | Smith |
| 5,963,964 A | 10/1999 | Nielsen |
| 5,963,967 A | 10/1999 | Umen et al. |
| 5,966,441 A | 10/1999 | Calamera |
| 5,966,697 A | 10/1999 | Fergerson et al. |
| 5,974,406 A | 10/1999 | Bisdikian et al. |
| 5,974,430 A | 10/1999 | Mutschler et al. |
| 5,978,766 A | 11/1999 | Luciw |
| 5,978,779 A | 11/1999 | Stein et al. |
| 5,978,780 A | 11/1999 | Watson |
| 5,978,828 A | 11/1999 | Greer et al. |
| 5,978,842 A | 11/1999 | Noble |

| | | |
|---|---|---|
| 5,982,891 A | 11/1999 | Ginter et al. |
| 5,983,170 A | 11/1999 | Goodman |
| 5,983,200 A | 11/1999 | Slotznick |
| 5,983,214 A | 11/1999 | Lang et al. |
| 5,983,227 A | 11/1999 | Nazem et al. |
| 5,983,268 A | 11/1999 | Freivald |
| 5,987,440 A | 11/1999 | O'Neil et al. |
| 5,987,454 A | 11/1999 | Hobbs |
| 5,987,466 A | 11/1999 | Greer et al. |
| 5,987,498 A | 11/1999 | Athing et al. |
| 5,987,611 A | 11/1999 | Freund |
| 5,990,887 A | 11/1999 | Redpath et al. |
| 5,991,735 A | 11/1999 | Gerace |
| 5,991,756 A | 11/1999 | Wu |
| 5,995,756 A | 11/1999 | Hermann |
| 5,995,943 A | 11/1999 | Bull et al. |
| 5,995,965 A | 11/1999 | Experton |
| 5,996,010 A | 11/1999 | Leong et al. |
| 5,999,179 A | 12/1999 | Kekic et al. |
| 5,999,940 A | 12/1999 | Ranger |
| 5,999,975 A | 12/1999 | Kittaka et al. |
| 6,000,033 A | 12/1999 | Kelly et al. |
| 6,000,832 A | 12/1999 | Franklin et al. |
| 6,003,077 A | 12/1999 | Bawden et al. |
| 6,006,217 A | 12/1999 | Lumsden |
| 6,006,227 A | 12/1999 | Freeman et al. |
| 6,006,333 A | 12/1999 | Nielsen |
| 6,009,408 A | 12/1999 | Buchanan |
| 6,009,429 A | 12/1999 | Greer et al. |
| 6,012,087 A | 1/2000 | Freivald et al. |
| 6,014,429 A | 1/2000 | LaPorta et al. |
| 6,014,502 A | 1/2000 | Moraes |
| 6,018,724 A | 1/2000 | Arent |
| 6,023,684 A | 2/2000 | Pearson |
| 6,023,698 A | 2/2000 | Lavey |
| 6,029,175 A | 2/2000 | Chow et al. |
| 6,029,180 A | 2/2000 | Murata et al. |
| 6,029,182 A | 2/2000 | Nehab et al. |
| 6,029,195 A | 2/2000 | Herz |
| 6,029,207 A | 2/2000 | Heninger |
| 6,031,354 A | 2/2000 | Wiley et al. |
| 6,032,162 A | 2/2000 | Burke |
| 6,038,601 A | 3/2000 | Lambert et al. |
| 6,038,603 A | 3/2000 | Joseph |
| 6,038,668 A | 3/2000 | Chipman et al. |
| 6,041,307 A | 3/2000 | Ahuja et al. |
| 6,041,326 A | 3/2000 | Amro et al. |
| 6,044,372 A | 3/2000 | Rothfus et al. |
| 6,044,465 A | 3/2000 | Dutcher et al. |
| 6,055,236 A | 4/2000 | Nessett et al. |
| 6,055,570 A | 4/2000 | Nielsen |
| 6,058,250 A | 5/2000 | Harwood et al. |
| 6,058,417 A | 5/2000 | Hess et al. |
| 6,061,700 A | 5/2000 | Brobst et al. |
| 6,061,716 A | 5/2000 | Moncreiff |
| 6,064,985 A | 5/2000 | Anderson |
| 6,065,120 A | 5/2000 | Laursen et al. |
| 6,070,150 A | 5/2000 | Remington et al. |
| 6,073,173 A | 6/2000 | Bittinger et al. |
| 6,078,907 A | 6/2000 | Lamm |
| 6,078,924 A | 6/2000 | Ainsbury et al. |
| 6,078,929 A | 6/2000 | Rao |
| 6,081,830 A | 6/2000 | Schindler |
| 6,084,585 A | 7/2000 | Kraft et al. |
| 6,085,186 A | 7/2000 | Christianson et al. |
| 6,085,188 A | 7/2000 | Bachmann et al. |
| 6,085,229 A | 7/2000 | Newman et al. |
| 6,085,238 A | 7/2000 | Yuasa et al. |
| 6,088,700 A | 7/2000 | Larsen et al. |
| 6,088,711 A | 7/2000 | Fein et al. |
| 6,088,722 A | 7/2000 | Herz et al. |
| 6,101,500 A | 8/2000 | Lau |
| 6,108,686 A | 8/2000 | Williams, Jr. |
| 6,108,691 A | 8/2000 | Lee et al. |
| 6,112,212 A | 8/2000 | Heitler |
| 6,119,079 A | 9/2000 | Wang et al. |
| 6,119,098 A | 9/2000 | Guyot et al. |
| 6,119,101 A | 9/2000 | Peckover |
| 6,119,229 A | 9/2000 | Martinez et al. |
| 6,122,673 A | 9/2000 | Basak et al. |
| 6,125,186 A | 9/2000 | Saito et al. |
| 6,125,352 A | 9/2000 | Franklin et al. |
| 6,128,602 A | 10/2000 | Northington et al. |
| 6,128,603 A | 10/2000 | Dent et al. |
| 6,128,624 A | 10/2000 | Papierniak et al. |
| 6,128,655 A | 10/2000 | Fields et al. |
| 6,131,115 A | 10/2000 | Anderson et al. |
| 6,134,532 A | 10/2000 | Lazarus et al. |
| 6,134,534 A | 10/2000 | Walker et al. |
| 6,134,548 A | 10/2000 | Gottsman et al. |
| 6,134,658 A | 10/2000 | Multerer et al. |
| 6,138,155 A | 10/2000 | Davis et al. |
| 6,138,158 A | 10/2000 | Boyle |
| 6,141,333 A | 10/2000 | Chavez, Jr. |
| 6,141,651 A | 10/2000 | Riley et al. |
| 6,147,975 A | 11/2000 | Bowman-Amuah |
| 6,148,402 A | 11/2000 | Campbell |
| 6,157,924 A | 12/2000 | Austin |
| 6,167,448 A | 12/2000 | Hemphill et al. |
| 6,169,992 B1 | 1/2001 | Beall et al. |
| 6,172,677 B1 | 1/2001 | Stautner et al. |
| 6,175,864 B1 | 1/2001 | Addison et al. |
| 6,181,786 B1 | 1/2001 | Detampel et al. |
| 6,182,085 B1 | 1/2001 | Eichstaedt |
| 6,182,142 B1 | 1/2001 | Win |
| 6,182,229 B1 | 1/2001 | Nielsen |
| 6,185,601 B1 | 2/2001 | Wolff |
| 6,192,380 B1 | 2/2001 | Light et al. |
| 6,192,407 B1 | 2/2001 | Smith et al. |
| 6,195,651 B1 | 2/2001 | Handel et al. |
| 6,199,077 B1 | 3/2001 | Inala et al. |
| 6,199,079 B1 | 3/2001 | Gupta et al. |
| 6,199,082 B1 | 3/2001 | Ferrel et al. |
| 6,199,099 B1 | 3/2001 | Gershman et al. |
| 6,199,113 B1 | 3/2001 | Alegre et al. |
| 6,202,062 B1 | 3/2001 | Cameron et al. |
| 6,202,210 B1 | 3/2001 | Ludtke |
| 6,205,433 B1 | 3/2001 | Boesch |
| 6,205,456 B1 | 3/2001 | Nakao |
| 6,205,473 B1 | 3/2001 | Thomasson et al. |
| 6,208,336 B1 | 3/2001 | Carter |
| 6,208,975 B1 | 3/2001 | Bull |
| 6,212,548 B1 | 4/2001 | DeSimone et al. |
| 6,219,705 B1 | 4/2001 | Steinberger et al. |
| 6,223,292 B1 | 4/2001 | Dean et al. |
| 6,226,648 B1 | 5/2001 | Appleman et al. |
| 6,226,750 B1 | 5/2001 | Trieger |
| 6,233,592 B1 | 5/2001 | Schnelle et al. |
| 6,233,608 B1 | 5/2001 | Laursen et al. |
| 6,236,991 B1 | 5/2001 | Frauenhofer et al. |
| 6,236,994 B1 | 5/2001 | Swartz et al. |
| 6,237,096 B1 | 5/2001 | Bisbee et al. |
| 6,240,443 B1 | 5/2001 | Suzuki et al. |
| 6,243,755 B1 | 6/2001 | Takagi et al. |
| 6,252,544 B1 | 6/2001 | Hoffberg |
| 6,253,188 B1 | 6/2001 | Witek et al. |
| 6,253,208 B1 | 6/2001 | Wittgreffe et al. |
| 6,253,326 B1 | 6/2001 | Lincke et al. |
| 6,260,039 B1 | 7/2001 | Schneck et al. |
| 6,263,501 B1 | 7/2001 | Schein et al. |
| 6,266,615 B1 | 7/2001 | Jin |
| 6,266,774 B1 | 7/2001 | Sampath et al. |
| 6,271,840 B1 | 8/2001 | Finseth et al. |
| 6,278,993 B1 | 8/2001 | Kumar et al. |
| 6,279,037 B1 | 8/2001 | Tams et al. |
| 6,282,278 B1 | 8/2001 | Doganata et al. |

| | | |
|---|---|---|
| 6,286,029 B1 | 9/2001 | Delph |
| 6,286,043 B1 | 9/2001 | Cuomo et al. |
| 6,289,346 B1 | 9/2001 | Milewski et al. |
| 6,289,389 B1 | 9/2001 | Kikinis |
| 6,292,787 B1 | 9/2001 | Scott et al. |
| 6,301,584 B1 | 10/2001 | Ranger |
| 6,301,621 B1 | 10/2001 | Haverstock et al. |
| 6,304,860 B1 | 10/2001 | Martin, Jr. et al. |
| 6,313,835 B1 | 11/2001 | Gever et al. |
| 6,317,718 B1 | 11/2001 | Fano |
| 6,317,783 B1 | 11/2001 | Freishtat |
| 6,324,538 B1 | 11/2001 | Wesinger, Jr. et al. |
| 6,324,569 B1 | 11/2001 | Ogilvie et al. |
| 6,330,321 B2 | 12/2001 | Detampel, Jr. et al. |
| 6,330,561 B1 | 12/2001 | Cohen et al. |
| 6,330,592 B1 | 12/2001 | Makuch et al. |
| 6,334,132 B1 | 12/2001 | Weeks |
| 6,339,761 B1 | 1/2002 | Cottingham |
| 6,341,353 B1 | 1/2002 | Herman et al. |
| 6,345,300 B1 | 2/2002 | Bakshi et al. |
| 6,347,398 B1 | 2/2002 | Parthasarathy et al. |
| 6,349,257 B1 | 2/2002 | Liu et al. |
| 6,349,307 B1 | 2/2002 | Chen |
| 6,351,464 B1 | 2/2002 | Galvin et al. |
| 6,356,834 B2 | 3/2002 | Hancock et al. |
| 6,356,899 B1 | 3/2002 | Chakrabarti et al. |
| 6,356,905 B1 | 3/2002 | Gershman et al. |
| 6,360,205 B1 | 3/2002 | Iyengar |
| 6,360,332 B1 | 3/2002 | Weinberg et al. |
| 6,366,923 B1 | 4/2002 | Lenk et al. |
| 6,377,567 B1 | 4/2002 | Leonard |
| 6,377,993 B1 | 4/2002 | Brandt et al. |
| 6,380,890 B1 | 4/2002 | Smith et al. |
| 6,381,592 B1 | 4/2002 | Reuning |
| 6,385,595 B1 | 5/2002 | Kolling et al. |
| 6,385,655 B1 | 5/2002 | Smith et al. |
| 6,397,212 B1 | 5/2002 | Biffar |
| 6,405,245 B1 | 6/2002 | Burson et al. |
| 6,408,292 B1 | 6/2002 | Bakalash et al. |
| 6,412,073 B1 | 6/2002 | Rangan |
| 6,421,693 B1 | 7/2002 | Nishiyama et al. |
| 6,424,979 B1 | 7/2002 | Livingston et al. |
| 6,430,542 B1 | 8/2002 | Moran |
| 6,438,580 B1 | 8/2002 | Mears et al. |
| 6,442,590 B1 | 8/2002 | Inala et al. |
| 6,442,607 B1 | 8/2002 | Korn et al. |
| 6,453,339 B1 | 9/2002 | Schultz et al. |
| 6,460,038 B1 | 10/2002 | Khan et al. |
| 6,470,383 B1 | 10/2002 | Leshem et al. |
| 6,473,740 B2 | 10/2002 | Cockrill et al. |
| 6,484,155 B1 | 11/2002 | Kiss |
| 6,490,601 B1 | 12/2002 | Markus et al. |
| 6,499,036 B1 | 12/2002 | Gurevich |
| 6,499,042 B1 | 12/2002 | Markus |
| 6,516,303 B1 | 2/2003 | Wallman |
| 6,517,587 B2 | 2/2003 | Satyavolu et al. |
| 6,538,673 B1 | 3/2003 | Maslov |
| 6,544,295 B1 | 4/2003 | Bodnar |
| 6,546,393 B1 | 4/2003 | Khan |
| 6,553,359 B1 | 4/2003 | Schwenkreis |
| 6,560,639 B1 | 5/2003 | Dan et al. |
| 6,567,814 B1 | 5/2003 | Bankler et al. |
| 6,567,850 B1 | 5/2003 | Freishtat |
| 6,572,662 B2 | 6/2003 | Manohar et al. |
| 6,594,766 B2 | 7/2003 | Rangan et al. |
| 6,601,066 B1 | 7/2003 | Davis-Hall et al. |
| 6,605,120 B1 | 8/2003 | Fields et al. |
| 6,606,606 B2 | 8/2003 | Starr |
| 6,609,128 B1 | 8/2003 | Underwood |
| 6,609,200 B2 | 8/2003 | Anderson |
| 6,625,581 B1 | 9/2003 | Perkowski |
| 6,631,402 B1 | 10/2003 | Devine et al. |
| 6,631,496 B1 | 10/2003 | Li et al. |
| 6,633,910 B1 | 10/2003 | Rajan et al. |
| 6,643,652 B2 | 11/2003 | Helgeson et al. |
| 6,654,761 B2 | 11/2003 | Tenev et al. |
| 6,665,658 B1 | 12/2003 | DaCosta et al. |
| 6,694,546 B1 | 2/2004 | Kasem |
| 6,697,860 B1 | 2/2004 | Kung |
| 6,717,376 B2 | 4/2004 | Lys et al. |
| 6,718,365 B1 | 4/2004 | Dutta |
| 6,725,425 B1 | 4/2004 | Rajan et al. |
| 6,732,102 B1 | 5/2004 | Khandekar |
| 6,745,229 B1 | 6/2004 | Gobin et al. |
| 6,754,833 B1 | 6/2004 | Black et al. |
| 6,792,082 B1 | 9/2004 | Levine |
| 6,792,422 B1 | 9/2004 | Stride et al. |
| 6,801,929 B1 | 10/2004 | Donoho et al. |
| 6,802,042 B2 | 10/2004 | Rangan |
| 6,807,558 B1 | 10/2004 | Hassett et al. |
| 6,810,414 B1 | 10/2004 | Brittain |
| 6,826,553 B1 | 11/2004 | DaCosta et al. |
| 6,847,988 B2 | 1/2005 | Toyouchi et al. |
| 6,856,415 B1 | 2/2005 | Simchik et al. |
| 6,859,212 B2 | 2/2005 | Kumar et al. |
| 6,901,394 B2 | 5/2005 | Chauhan et al. |
| 6,915,336 B1 | 7/2005 | Hankejh et al. |
| 6,915,482 B2 | 7/2005 | Jellum et al. |
| 6,920,609 B1 | 7/2005 | Manber et al. |
| 6,944,660 B2 | 9/2005 | Eshghi et al. |
| 7,006,993 B1 | 2/2006 | Cheong et al. |
| 7,013,310 B2 | 3/2006 | Messing et al. |
| 7,085,994 B2 | 8/2006 | Gvily |
| 7,085,997 B1 | 8/2006 | Wu et al. |
| 7,178,096 B2 | 2/2007 | Rangan et al. |
| 7,225,249 B1 | 5/2007 | Barry et al. |
| 7,249,315 B2 | 7/2007 | Moetteli |
| 7,313,813 B2 | 12/2007 | Rangan et al. |
| 7,328,176 B2 | 2/2008 | Tarvydas et al. |
| 7,606,752 B2 * | 10/2009 | Hazlehurst et al. ............ 705/35 |
| 2001/0000537 A1 | 4/2001 | Inala et al. |
| 2001/0011341 A1 | 8/2001 | Hayes, Jr. et al. |
| 2001/0016034 A1 | 8/2001 | Singh et al. |
| 2001/0020237 A1 | 9/2001 | Yarnall et al. |
| 2001/0020242 A1 | 9/2001 | Gupta et al. |
| 2001/0023414 A1 | 9/2001 | Kumar et al. |
| 2001/0032182 A1 | 10/2001 | Kumar et al. |
| 2001/0037294 A1 | 11/2001 | Freishtat et al. |
| 2001/0051907 A1 | 12/2001 | Kumar et al. |
| 2002/0002536 A1 | 1/2002 | Braco |
| 2002/0007330 A1 | 1/2002 | Neil et al. |
| 2002/0015480 A1 | 2/2002 | Daswani et al. |
| 2002/0019810 A1 | 2/2002 | Kumar et al. |
| 2002/0023104 A1 | 2/2002 | Satyavolu et al. |
| 2002/0023108 A1 | 2/2002 | Daswani et al. |
| 2002/0032782 A1 | 3/2002 | Rangan et al. |
| 2002/0059369 A1 | 5/2002 | Kern et al. |
| 2002/0078079 A1 | 6/2002 | Rangan et al. |
| 2002/0082990 A1 | 6/2002 | Jones |
| 2002/0095651 A1 | 7/2002 | Kumar et al. |
| 2002/0174006 A1 | 11/2002 | Rugge et al. |
| 2003/0120774 A1 | 6/2003 | Satyavolu et al. |
| 2003/0126134 A1 | 7/2003 | Messing et al. |
| 2003/0191661 A1 | 10/2003 | Doyle et al. |
| 2003/0204485 A1 | 10/2003 | Triggs |
| 2003/0225688 A1 * | 12/2003 | Dobbins ..................... 705/39 |
| 2004/0031030 A1 | 2/2004 | Kidder et al. |
| 2004/0078282 A1 | 4/2004 | Robinson |
| 2004/0158524 A1 | 8/2004 | Anderson et al. |
| 2004/0162778 A1 | 8/2004 | Kramer et al. |
| 2004/0236696 A1 | 11/2004 | Aoki et al. |
| 2005/0034055 A1 | 2/2005 | Rangan et al. |
| 2005/0165651 A1 | 7/2005 | Mohan |
| 2005/0210297 A1 | 9/2005 | Wu et al. |
| 2006/0116949 A1 * | 6/2006 | Wehunt et al. ................ 705/35 |
| 2006/0253463 A1 | 11/2006 | Wu et al. |

2006/0253742 A1  11/2006  Elenburg et al.

FOREIGN PATENT DOCUMENTS

| EP | 0786728 | 7/1997 |
|---|---|---|
| EP | 0848338 | 6/1998 |
| JP | 7074817 | 3/1995 |
| WO | 97/16796 | 5/1997 |
| WO | 97/37314 | 10/1997 |
| WO | 98/28698 | 7/1998 |
| WO | 01/33759 | 5/2001 |

OTHER PUBLICATIONS

Notice of Motion, Motion and Memorandum of Points and Authorities in Support of Defendant Cashedge, Inc.'s Motion for Leave to File First Amended Answer and Counterclaims, U.S. District Court, N.D., California, *Yodlee v. Cashedge, Inc.*, Case No. C-05-01550.
Declaration of Jonathan J. Lamberson in Support of Yodlee's Opposition to Cashedge's Motion for Leave to File a First Amended Answer, U.S. District Court, N.D., California, *Yodlee v. Cashedge, Inc.*, Case No. C-05-01550.
Yodlee's Opposition to Cashedge's Motion For Leave to File a First Amended Answer, U.S. District Court, N.D., California, *Yodlee v. Cashedge, Inc.*, Case No. C-05-01550.
Cashedge's Reply Brief in Support of its Motion for Leave to File First Amended Answer and Counterclaims, U.S. District Court, N.D., California, *Yodlee v. Cashedge, Inc.*, Case No. C-05-01550.
Declaration of Richard M. Koehl in Support of Cashedge's Motion for Leave to File First Amended Answer and Counterclaims, U.S. District Court, N.D., California, *Yodlee v. Cashedge, Inc.*, Case No. C-05-01550.
Yodlee's Motion for Leave to File a Sur-reply to Cashedge's Reply Brief in Support of its Motion for Leave to File First Amended Answer and Counterclaims, U.S. District Court, N.D., California, *Yodlee v. Cashedge, Inc.*, Case No. C-05-01550.
Cashedge's Opposition to Yodlee's Motion for Leave to File a Sur-reply, U.S. District Court, N.D., California, *Yodlee v. Cashedge, Inc.*, Case No. C-05-01550.
Declaration of Jonathan J. Lamberson Pursuant to Civil Local Rule 79-5(d) Requesting That Documents Remain Under Seal, U.S. District Court, N.D., California, *Yodlee v. Cashedge, Inc.*, Case No. C-05-01550.
First Amended Answer and Counterclaims; Demand for Jury Trial, U.S. District Court, N.D., California, *Yodlee v. Cashedge, Inc.*, Case No. C-05-01550.
Plaintiff Yodlee, Inc.'s Response to Defendant's First Amended Answer and Counterclaims, U.S. District Court, N.D., California, *Yodlee v. Cashedge, Inc.*, Case No. C-05-01550.
Defendant Cashedge, Inc.'s Notice of Motion, Motion, and Memorandum in Support of Motion for Summary Judgment of Invalidity of the '077 and '783 Patents, U.S. District Court, N.D., California, *Yodlee v. Cashedge, Inc.*, Case No. C-05-01550.
Yodlee's Opposition to Cashedge's Motion for Summary Judgment of Invalidity of the '077 and '783 Patents, U.S. District Court, N.D., California, *Yodlee v. Cashedge, Inc.*, Case No. C-05-01550.
Cashedge's Final Invalidity Contentions, U.S. District Court, N.D., California, *Yodlee v. Cashedge, Inc.*, Case No. C-05-01550.
Defendant Cashedge's Amended Final Invalidity Contentions [Pat. Local Rules 3-3, 3-6, and 3-7], U.S. District Court, N.D., California, *Yodlee v. Cashedge, Inc.*, Case No. C-05-01550.
Zhao, Y., "A Single Login Web Service Integrator—Web Entrance," Mar. 15, 2004.
Omidyar, P., "Automatic Notification of Web Site Changes," Aug. 30, 1995.
Boeing Chooses NetMind Enterprise Minder to Help Thousands of Employees Track Web-Based Information, PR Newswire, (p. 6426), Nov. 19, 1998.
Sullivan, E., "Caravelle's InfoWatcher 1.1 Keeps an Eye on the Web," PC Week, (p. 33), Jul. 14, 1997.
Cognisoft Announces IntelliServ, A Revolutionary Intranet Information Management Application; A Powerful Solution That Enables the Right Information to Find the Right User at the Right Time, Business Wire, (p. 8140125), Aug. 14, 1996.
FirstFloor and AirMedia Announce Partnership; FirstFloor Smart Delivery to Utilize AirMedia Wireless Technologies, Business Wire, (p. 7291077), Jul. 29, 1997.
Fujitsu Announces Availability of ByeDesk Link for Alpha-Numeric Pages; Next Step in Empowering Mobile Workforces with "Anyplace, Anytime" Information, Business Wire, (p. 7091066), Jul. 9, 1998.
Fujitsu Announces "WebAgent" Application as Part of ByeDesk Link Wireless Server Software, Business Wire, (p. 09010210), Sep. 1, 1998.
Fujitsu Picks NetMind for Wireless Web Agent Software, Computergram International, Sep. 2, 1998.
Fujitsu's ByeDesk Link Now Available on the PalmPilot, Business Wire, (p. 1455), Sep. 21, 1998.
GC Tech's GlobelD Payment Internet Commerce Software Supports Microsoft Merchant Server, Business Wire, (p. 1211286), Jan. 21, 1997.
Kravitz, D.W., "Highly Scalable on-Line Payments Via Task Decoupling," Financial Cryptography First International Conference, (p. 355-73), 1997.
Rapoza, J., "Minding Web Site Changes," PC Week, V. 15, No. 37 (p. 32), Sep. 14, 1998.
NetMind Accepts $7 Million StrategiC Investment From Three Prominent VC Firms—BancBoston, Softbank and Draper Fisher Jurvetson, PR Newswire, (p. 7632), Nov. 6,1998.
NetMind Celebrates Five Million Active Users, PR Newswire, (p. 6488), Dec. 18, 1998.
NetMind Updates the World's Largest Free Web Tracking Service, PR Newswire, (p. 5077), Sep. 18, 1998.
Douglis, F. et al., "The AT&T Internet Difference Engine: Tracking and Viewing Changes on the Web," World Wide Web, 1(1), (pp. 27-44), Jan. 1998.
Ajzenszmidt, I.M., "Versatile Intelligent Agents in Commercial Applications," Dec. 13, 1998.
Zhao, Y., "WebEntree: A Web Service Aggregator," IBM Systems Journal, vol. 37, No. 4, 1998.
WebVCR Product Bulletin.
Knoblock, C. et al., "Building Agents for Internet-based Supply Chain Integration," University of Southern California, Information Sciences Institute and Integrated Media Systems Center.
Muslea, I. et al., "A Hierarchical Approach to Wrapper Induction," University of Southern California.
Muslea, I. et al., "Wrapper Induction for Semistructured, Web-Based Information Sources," University of Southern California, Information Sciences Institute, the Integrated Media Systems Center, and Computer Science Department.
Ashish, N. et al., "Optimizing Information Agents by Selectively Materializing Data," American Association for Artificial Intelligence (1998).
Knoblock, C. et al., "Modeling Web Sources for Information Integration," American Association for Artificial Intelligence (1997).
Ashish, N. et al., "Intelligent Caching for Information Mediators: A KR Based Approach," University of Southern California, Information Sciences Institute, the Integrated Media Systems Center, and Computer Science Department.
Ashish, N. et al., "Wrapper Generation for Semi-structured Internet Sources," University of Southern California, Information Sciences Institute and Computer Science Department.
Ashish, N. et al., "Semi-automatic Wrapper Generation for Internet Information Sources," University of Southern California, Information Sciences Institute and Computer Science Department.
Frank, M. et al., "An Intelligent User Interface for Mixed-Initiative Multi-Source Travel Planning," Information Sciences Institute, University of Southern California. Knoblock, C., "Deploying Information Agents on the Web," University of Southern California, Information Sciences Institute and Computer Science Department.
Knoblock, C. "Deploying Information Agents on the Web," University of Southern California, Information Sciences Institute and Computer Science Department.
Knoblock, C. et al., "The Ariadne approach to Web-based information integration," University of Southern California, Sep./Oct. 1998.
"On-Line Financial Services Project".

"Online Financial Services Participant Guide", Telephone Services University, 1996.

Quick Reference Handout for Wells Fargo On-Line, Jan. 23, 1996, (18 Pages).

Orbix Programmer's Guide, IONA Technologies, Apr. 1995, (10 Pages).

Trader Implementation with Orbix & Allbase (TC talk, Jun. 1994).

Business Wire Article: Wells Fargo Bank is first to offer customers Internet access to bank account balances, May 18, 1995.

Ronayne, M. et al., "Preserving the Past Designing the Future," The Cushing Group, Inc.

"Introduction to Distributed Client/Server Computing With Object Broker," The Cushing Group, Inc.

"Using CORBA to Integrate Legacy Systems," Presented by Erik S. Townsend, Object World Boston, Mar. 22, 1995.

The Business Case for Distributed Computing, Presented by Michael L. Ronayne, Object World Boston, May 1996.

"Lessons Learned Deploying Large-Scale Distributed Object Computing Systems," Presented by Michael L. Ronayne, Object World Boston, May 1996.

Birrell, A. et al., "Implementing Remote Procedure Calls," ACM Transactions on Computer Systems, vol. 2, No. 1, (pp. 39-59), Feb. 1984.

Ronayne, M. et al., "Distributed Object Technology at Wells Fargo Bank," The Cushing Group, Inc. (1996).

American Banker Article, "Wells Fargo: Innovations in Customer Management," Nov. 3, 1997.

Edwards, N. et al., "Distributed Objects and the World Wide Web," Abstract; Aug. 24, 1994.

"A Note on Distributed Computing," Sun Microsystems Laboratories, Inc., Nov. 1994.

DeNitto, K., "DCE Means Business," Mar. 20, 1995.

Smith, M., Interview with Bruce MacNaughton Article, Nov. 1996.

Truncale, D., CompuServe Brings NT Online Article, Nov. 1996.

CompuServe Keynote Address Given at Internet@Telecom95, Geneva, Switzerland, Oct. 8, 1995.

Edwards, J. et al., "3-Tier Client/Server at Work," Foreword by Robert Orfali, author of The Essential Client/Server Survival Guide.

Wells Fargo: A Case Study, The Cushing Group, Inc. (1994-1997).

NetBill: An Internet Commerce System Optimized for Network-Delivered Services•, Marvin Sirbu and J.D. Tygar, IEEE Personal Communications, 2:4, Aug. 1995, pp. 34-39.

"Collapsible User Interfaces for Information Retrieval Agents," Martin Frank and Pedro Szekely, Proceedings of the International Conference on Intelligent User Interfaces, Jan. 5-8, 1999, Redondo, CA, pp. 15-22.

"A Softbot-based Interface to the Internet," Oren Etzioni and Daniel Weld, Communicaiton in the ACM, vol. 37, No. 7, Jul. 1994, pp. 72-76.

"Strategic Directions in Database Systems—Breaking Out of the Box," Avi Silberschatz and Stan Zdonik et al., ACM Computing Surveys, vol. 28, No. 4, pp. 764-778, Dec. 1996.

"Database Security and Privacy," Sushil Jajodia, ACM Computing Surveys, vol. 28, Issue 1, pp. 129-131, Mar. 1996.

"Managing Security and Privacy of information," Sushil Jajodia, ACM Computing Surveys, vol. 28, Issue 4, Dec. 1996.

Masao Ito, "producet Review WWW Autopilot Software Naminoriyaro Enterprise", Nikkei Windows NT, No. 19, Nikkei BP, Oct. 1, 1998, pp. 26-28 (JPO CSDB Literature No.: National Technical Journal 1998-01804-002.

Masaya Suzuki, "Naminoriyaro Enterprise Ver. 1.0", ASCII NT, vol. 3, No. 10 ASCII Corporation, Oct. 1, 1998, pp. 118-119 (JPO CSDB Literature No.: National Technical Journal 1998-01100-010).

Naminoriyaro Plays an Active Role in Small Offices, Inter-Net magazine, No. 44, Impress Corporation, Sep. 1, 1998, p. 237 (JPO CSDB Literature No.: National Technical Journal 2000-00181-017).

"Autopilot Software Requires No Waiting Time", ASCII DOS/V Issue vol. 4, No. 10, ASCII Corporation, Oct. 1, 1998, pp. 190-191 (JPO CSDB Literature No.: National Technical Journal 1998-01798-011).

"Introduction to Outdoor Network" DOS/V magazine, vol. 6, No. 10, Soft Bank Corporation, May 15, 1997, 993 144-155 (JPO CSDB Literature No.: National Technical Journal 1998-01206-003.

Tadatoshi Hirono, "Have a Lead on Active Web Pages! No. 9", Internet ASCII, vol. 3, No. 4 ASCII Corporation, Apr. 1, 1998, pp. 390-391 (JPO CSDB Literature No.: National Technical Journal 2000-00394-027).

Kazuya Ishikawa, "What is a "cookie" which you see on WWW browsers?", Internet magazine, No. 39, Impress Corporation, Apr. 1, 1998, 99. 216-217 (JPO CSDB Literature No.: National Technical Journal 2000-00176-008).

Jun Nakajima, "Internet Techniques for Beginners No. 9", Interface, vol. 24, No. 9, CQ Publishing Co., Ltd., Sep. 1, 1998, 99. 72-76 (JPO CSBD Literature No.: National Technical Journal 1998-01164-001).

Chaum, D. Security without identification: transaction systems to make big brother obsolete. Communication of the ACM. Oct. 1985. vol. 28. Issue 10 pp. 1030-1044.

Chakrabarti et al. Mining the Web's link structure Computer Aug. 1999. pp. 60-67.

Das et al., Experiments in using agent-based retrieval from distributed heterogeneous database, Knowledge and Data Engineering Exchange Works Nov. 1997 abstract.

Frecon WEBPATH-a three dimensional Web history, Information Visualization IEEE Symposium on Oct. 1998, pp. 3-10.

Park, Intelligent query and browsing information retrieval (QBIR) agent, Acoustics, Speech and Signal Processing, IEEE International Conference May 1998 pp. 1173-1176.

O'Leary, Mick, "NewsWorks, brings new depth to Web news; the site excels with unique sources and value -added editorial features", Information Today v 14 p. 10.

Stanley, Tracey, "Intelligent Searching Agents on the Web", Jan. 1997, 4 pages, <http://www.ariadne.ac.uk/issue7/search -engines/>.

Jansen, James, "Using an Intelligent Agent to Enhance Search Engine Performance", Dec. 1998, 13 pages, • <http: /www. firstmonday.dk/issues issue2 3/iansen/>.

Lesser, Victor et al., "BIG: A Resource_Bounded Information Gathering Agent", Jan. 1998, 18 pages <http://dis.cs.umass.edu/research/big/>.

Severance C. Could LDAP be the next killer DAP? IEEE Computer vol. 30 Issue 8 Aug. 1997, pp. 88-89.

Gardner Stephen R. Building the data warehouse Communications of the ACM vol. 41 Issue 9 Sep. 1998, pp. 52-60.

Bontempo, Charles et al., The IBM data warehouse, Communications of the ACM, vol. 41, Issue 9, Sep. 1998, pp. 38-48.

Fryer et al. (Eds.), Microsoft Computer Dictionary, 1997 3rd Edition, pp. 238-240, 487.

Mollohan, Gary, Wireless Revolution, Appliance. Aug. 1999. vol. 56. No. 8 p. 49.

Anonymous. Dialog file 20 (World Reporter). No. 3629961. 3Com Announces the Pal, VII Connected Organizer, the First Handheld Solution for Out-Of-The-Box Wireless Internet Access. Business Wire. Dec. 2, 1998. 4 pages, especially p. 1, lines 18-33, p. 2, lines 1-10 p. 3, lines 21-30 and p. 4 lines 2-17 and lines 21-24.

Pelline, *LookSmart to be ISP home page*, Web page, unverified print date of Sep. 22, 2000, unverified cover date of Aug. 14, 1997.

Macavinta, *Excite, Lycos get more personal*, Web page, unverified print date of Sep. 22, 2000, unverified cover date of Apr. 13, 1998.

Shiro Iba, "What is it? Explorer File No. 7 'How much is the ease of use of Internet banking?'", SOHO Computing, vol. 3, No. 9, Cybiz Co., Ltd, Jun. 1, 1998, 99 55-60 (JPO CSDB Literature No.: National Technical Journal 1998-00782-002).

Unknown, Roboword, Multilingual Dictionary Tool, Jul. 27, 1997, pp. 1-3, all.

Maret et al., Multimedia Information Intechange: Web Forms Meet Date Servers, Jun. 11, 1999, IEEE International Conference, vol. 2, 499-505.

Armstrong, Robert et al., WebWatcher: A Learning Apprentice for the World Wide Web, School of Computer Science, Carnegie Mellon Univerity, Feb. 1995, pp. 1-7.

Hilbert et al., "Agents for Collecting Application Usage Data Over the Internet," ACM, 1998, pp. 149-156.

Lin et al., "Taking the Byte Out of Cookies," Computer and Society, Jun. 1998, pp. 39-51.

F. Kilander, "A Brief Comparison of News Filtering Software", Department of Computer and Systems Sciences, 1995, pp. 1-13.

K. Sycara et al., "Distributed Intelligent Agents", The Robotics Institue, Carnegie Mellon University, 1996, pp. 1-32.

W3C's, "HTML 4.0 Specification," Apr. 24, 1998, http://www.w3.org/TR/1998/REC-html40-19980424/, pp. 1-27.

Account Aggregation: Independent Study; University of Rhode Island, 2002.

* cited by examiner

HOST EXCHANGE IN BILL PAYING SERVICES

CROSS-REFERENCE TO RELATED APPLICATIONS

The present invention is a continuation application of co-pending patent application Ser. No. 11/851,131, filed on Sep. 6, 2007, which claims priority to a U.S. provisional patent application Ser. No. 60/843,450 entitled HOST EXCHANGE IN BILL PAYING SERVICES, filed on Sep. 7, 2006, disclosures of which are included herein in their entirety by inclusion and reference.

BACKGROUND OF THE INVENTION

1. Field of the Invention

The present invention is in the area of bill payment services, and pertains more particularly to processes for subscribers exchanging hosts in such services.

2. Discussion of the State of the Art

It is well known that financial institutions, such as banks in particular, provide customers with bill payment services. In a typical implementation, the bank provides interactive interfaces through web pages accessible through a customer's Internet browser for the customer to list payees and to schedule payments. A customer, for example, may receive bills on a regular basis from the local electric utility, the telephone company, an Internet service provider, a cable company for TV cable service, credit card companies and from many other product or service providers. In the bill paying service of a typical bank the user may enter contact and mailing information for the billing parties, and may schedule payments to be made at a future date. This information is saved at the host, and acted upon as scheduled, with the bank issuing payment (typically a check) on behalf of the user, and the user's account is debited when the payment is made.

As might be expected, not all customers of a bank remain customers of that bank forever. Banking is a competitive business, and many people change banks on occasion for whatever reason. When a customer quits one bank for another, and that customer has an active bill paying account with the bank, the customer has to clear that account, perhaps paying some bills early, or canceling payments scheduled in the service, before finally closing the account at the bank. Further, the same customer, opening an account at another bank and desiring to still have a bill-paying service, has to redo the somewhat tedious process of entering all of the usual payees, and rescheduling payments for outstanding bills.

What is clearly needed is a system and method for seamlessly accessing bill payment data for a customer at one bank, and for transferring all of that information to another bank as a part of the process of opening a new account.

SUMMARY OF THE INVENTION

In an embodiment of the present invention an account exchange system is provided, comprising a computerized data aggregation service enabled for gathering data for a subscriber from a data repository of a first financial institution and account exchange software operating on a server coupled to the data aggregation service. Initiated by the subscriber, the account exchange software causes an account to be terminated at the first financial institution and a new account to be opened at a second financial institution, using data from the first financial institution, and processing the data to be compatible with data requirements at the second financial institution.

In one embodiment bill payment services are configured for the subscriber at the second financial institution using data from a bill payment service at the first financial institution. Also in one embodiment data is accessed and transferred over the Internet network. The account may be one of a checking or a savings account, and the financial institutions may be commercial banks.

Data in various embodiments may include information about payees registered by the subscriber at the first financial institution, and subscriber data at the payee site including though not limited to account number, remittance address, and user authentication data. The data may also include payment schedules for each payee whether recurring payments or one-time payments. The data may also include data defining e-bills presented by any of the payees to the customer, the data including form structure and format and data describing presentment protocols for any of the payees of the customer. Also in some embodiments the data includes data describing the payment histories of the customer relative to any or all of the payees of the customer.

In some cases at least one of the financial institutions may discovered by the system through tangential services offered by an entity hosting the system. There may also be an interactive solicitation module that offers the subscriber help with the task of switching service accounts.

In another aspect of the invention a method for account transition is provided, comprising steps of (a) gathering data from a first financial institution by a data aggregation service for a subscriber of the data aggregation service who is also a customer of the first financial institution; and (b) initiated by the subscriber, causing, by account exchange software operating on a server coupled to the data aggregation service, a new account to be opened at a second financial institution, using data from the first financial institution, the data processed by the software to be compatible with data requirements at the second financial institution.

In one embodiment of the method bill payment services are configured for the subscriber at the second financial institution using data from a bill payment service at the first financial institution. Also in one embodiment data is accessed and transferred over the Internet network. Accounts may include checking or savings accounts. The financial institutions may be commercial banks.

In some embodiments the data includes information about payees registered by the subscriber at the first financial institution, and the payee information may include subscriber data at the payee site including though not limited to account number, remittance address, and user authentication data. Also in some embodiments the data may include payment schedules for each payee whether recurring payments or one-time payments.

In still other embodiments the data may include data defining e-bills presented by any of the payees to the customer, the data including form structure and format. The data may also include data describing presentment protocols for any of the payees of the customer. The data may also comprise data describing the payment histories of the customer relative to any or all of the payees of the customer.

In one embodiment at least one of the financial institutions is discovered by the system through tangential services offered by an entity hosting the system, and there may also be an interactive solicitation module that offers the subscriber help with the task of switching service accounts.

DETAILED DESCRIPTION

It is well known that there are enterprises that provide information collection, aggregation and normalization services for subscribers. One such enterprise is Yodlee.com, a California corporation to whom the inventors either have assigned, or have an obligation to assign the present invention.

Figure 1:
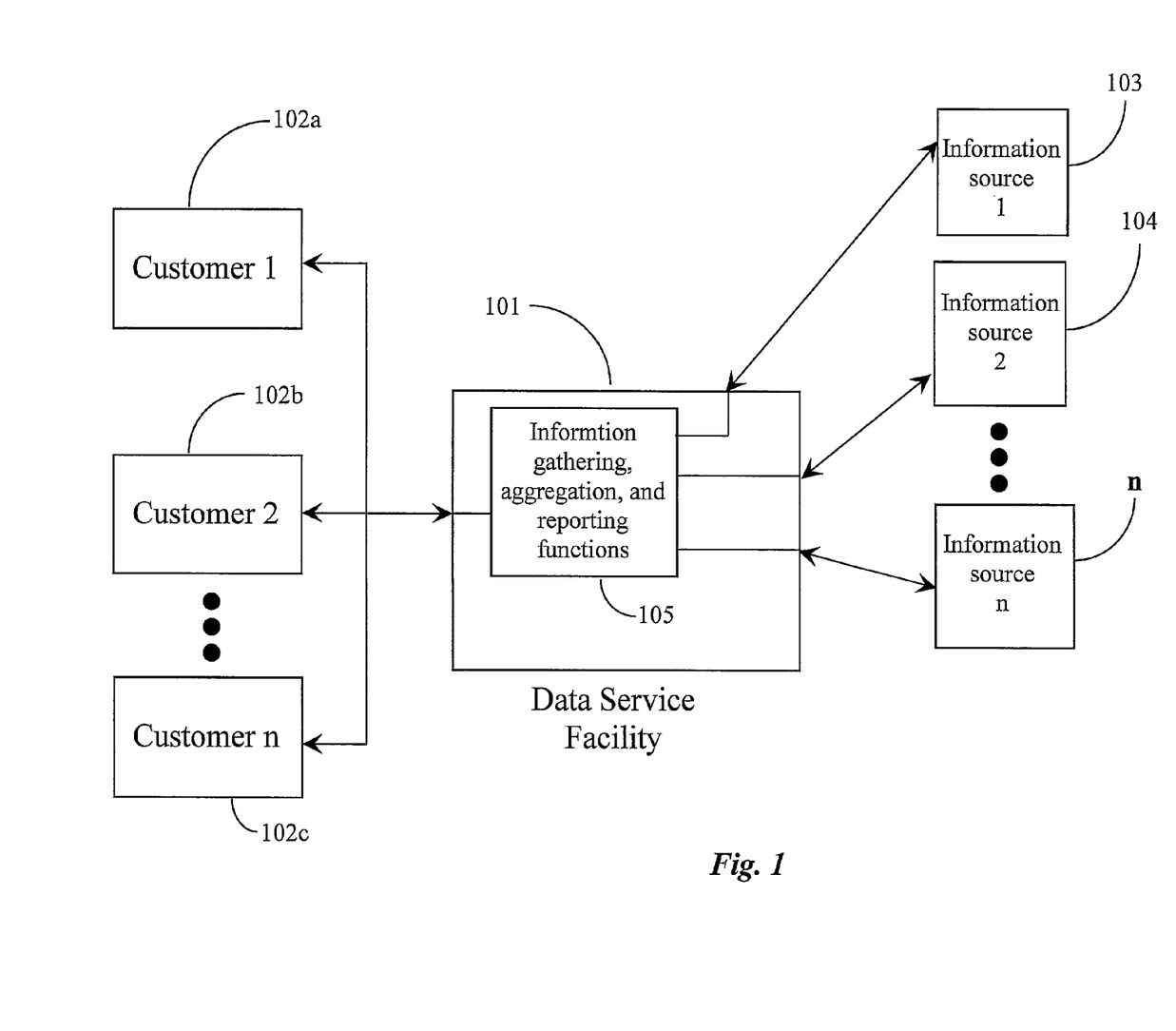
FIG. 1 is a block diagram illustrating a gathering and aggregation service known to the inventors.

FIG. 1 is a block diagram illustrating an Internet-connected information collection, aggregation, and transmission facility 101, interacting over the Internet network with customer stations 102a through 102c, labeled as customers 1 through n. These customers have authorized the facility to collect information from various information sources, labeled Information source 1 through n, and represented in FIG. 1 by element numbers 103, 104, through n. In this example information source 103 is a bank where customer 102 maintains a checking account, and as a part of the services of bank 103, customer 102 also uses a bill-paying service of bank 103. Customers 1-n are typically operating as computer stations connected to a network, which may be the Internet network in one embodiment. Customers 1-n may also be operating from other appliances, such as a hand-held computer appliance like a cellular telephone or personal digital assistant that has network access and navigation capabilities and a display function.

One of the services provided by facility 101 in this example is periodic access of customer 102's account balance, pending transactions, and the like for the customer's checking account at bank 103, which may be aggregated with other information from other information sources, such as accounts kept in other banks, and may be normalized and provided periodically to customer 102 as a summarized report. In some cases facility 101 may provide integrated bill paying services for customer 102, but in the present example the customer manages the bill paying functions with bank 103 entirely separately. Block 105 in FIG. 1 represents the functionality for the data collection, aggregation and reporting features described, including software and hardware.

In a typical implementation customer 102 logs in to facility 101, typically at a network server using one ID, such as a unique user name and password pair, and has previously provided, in a set up operation, log-in ID information to enterprise 101 for individual ones of information sources 103-n, at which customer 102 is also a customer. The customer therefore has only one user-name password pair to remember. Facility 101 therefore has access to the customer's account or accounts at the bank.

Figure 2:
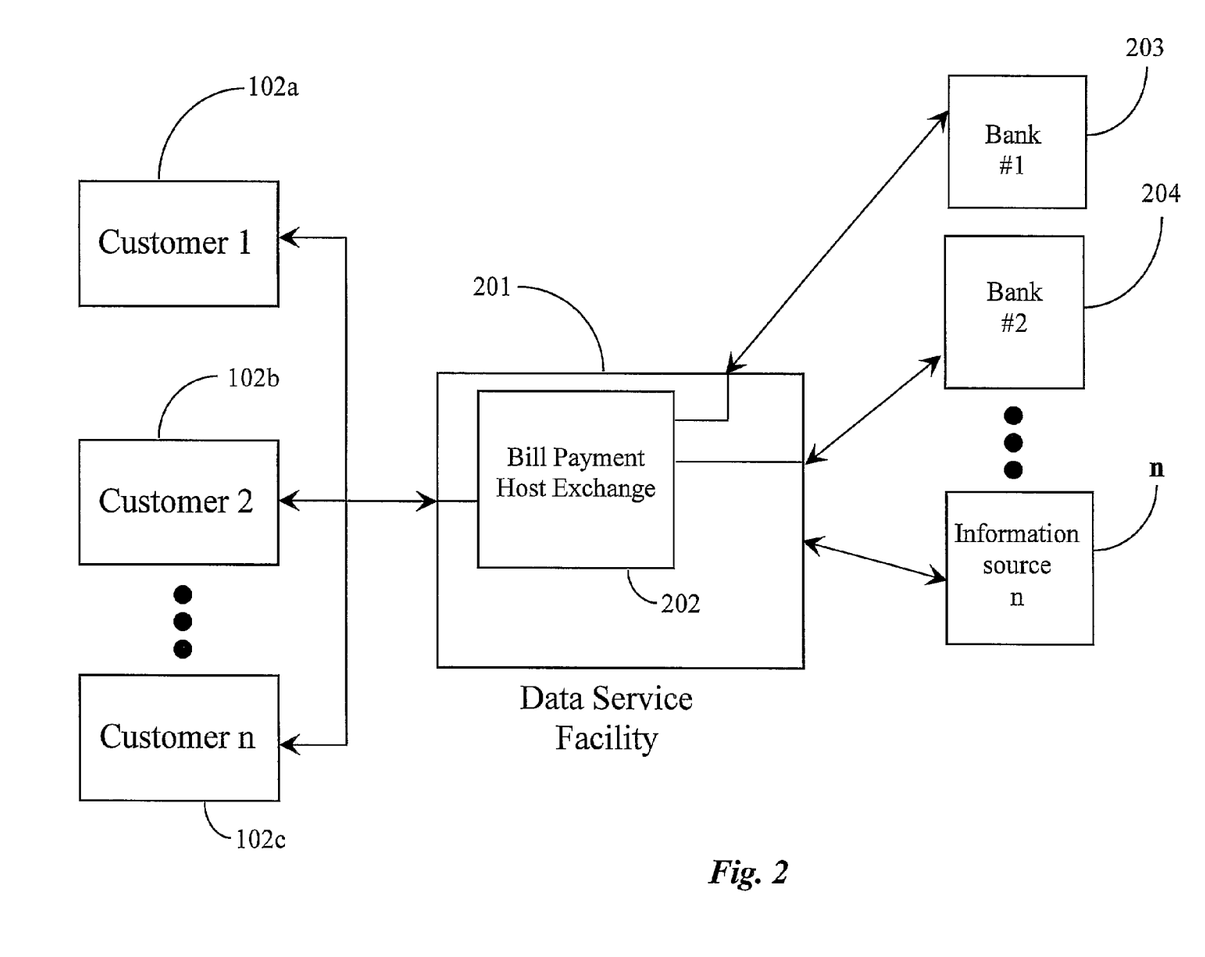
FIG. 2 is a block diagram illustrating a data transfer process according to an embodiment of the present invention.

FIG. 2 is a block diagram illustrating a data transfer process according to an embodiment of the present invention, implemented in the Yodlee-operated, Internet-connected, information collection, aggregation, and transmission facility of FIG. 1. The element number for this host facility has been changed to 201 because the functionality is different than for facility 101. Block 105 of FIG. 1 representing the data collection, aggregation and reporting functions is not shown in FIG. 2 to avoid complexity in the drawing, but may be assumed to also be present in the system of FIG. 2. Block 202 in FIG. 2 represents functionality, including software, for providing a new and unique service to customers 1 through n, represented by element numbers 102A through 102c in FIG. 2.

In the information collection, aggregation, normalization and reporting functions of facility 101 of FIG. 1, the functionality includes intimate knowledge of the web structure of the information sources, such as banks hosting checking accounts for customers. A part of that knowledge may also be the processes and formats through which individual banks provide bill-paying services for customers. These procedures and formats typically differ from bank to bank, which is a part of the difficulty a customer faces when closing an account at one bank and opening an account at another. In embodiments of the present invention these structures may be provided to facility 101 or they may otherwise be discovered by facility 101.

In one example of the present invention customer 1 may be in the process of closing his checking account at bank #1 (203), and opening a new account at bank #2 (204). Banks #1 and #2 are banks that are also information sources familiar to service facility 201, so facility 201 has stored information regarding the processes and formats for bill paying services at each bank. The example of banks and bill pay services is a good example wherein the invention may be practiced. However, the invention may be practiced with other types of service providers and services without departing from the spirit and scope of the present invention.

Initiated by a request from Customer 1, or in some cases by information in a customer profile for Customer 1, which may provide for an automatic service, perhaps triggered by a indication of an account being exchanged from one bank to another, facility 201 through functionality 202 accesses the information for customer 1 in bank #1's bill pay service, such as all of the historical contact information for payees, all scheduled payments at the time of the exchange of accounts, and the like, and processes the information to be compatible with the bill paying services of bank #2, and then enters all of the reformatted information in the data repositories of bank #2, thereby avoiding the tedious process for the customer of re-entering all of the information at bank #2 to set up a new bill payment service.

The example described above is but one example of the present invention, which is not limited to exchanging accounts between banks, and reformatting and exchanging bill-paying service information in the exchange process. The same functionality may be applicable to, for example, securities firms providing services over the Internet for customers, who may also be customers of facility 101/201. A customer exchanging an account from one firm to another, rather than setting up buy and sell orders and other instructions, for a new firm, may have that information reprocessed and entered to the new firm for the customer, in the procedure and format required by the new firm. The invention in other embodiments may be applicable to savings and loan company transfers and exchanges, mortgage exchanges and refinances, and in general to any situation where a customer of the facility 101/201 is also a customer of other enterprises known to facility 101/201, and the enterprise the customer may be leaving provides any sort of service which is pre-configured to provide future action.

Figure 3:
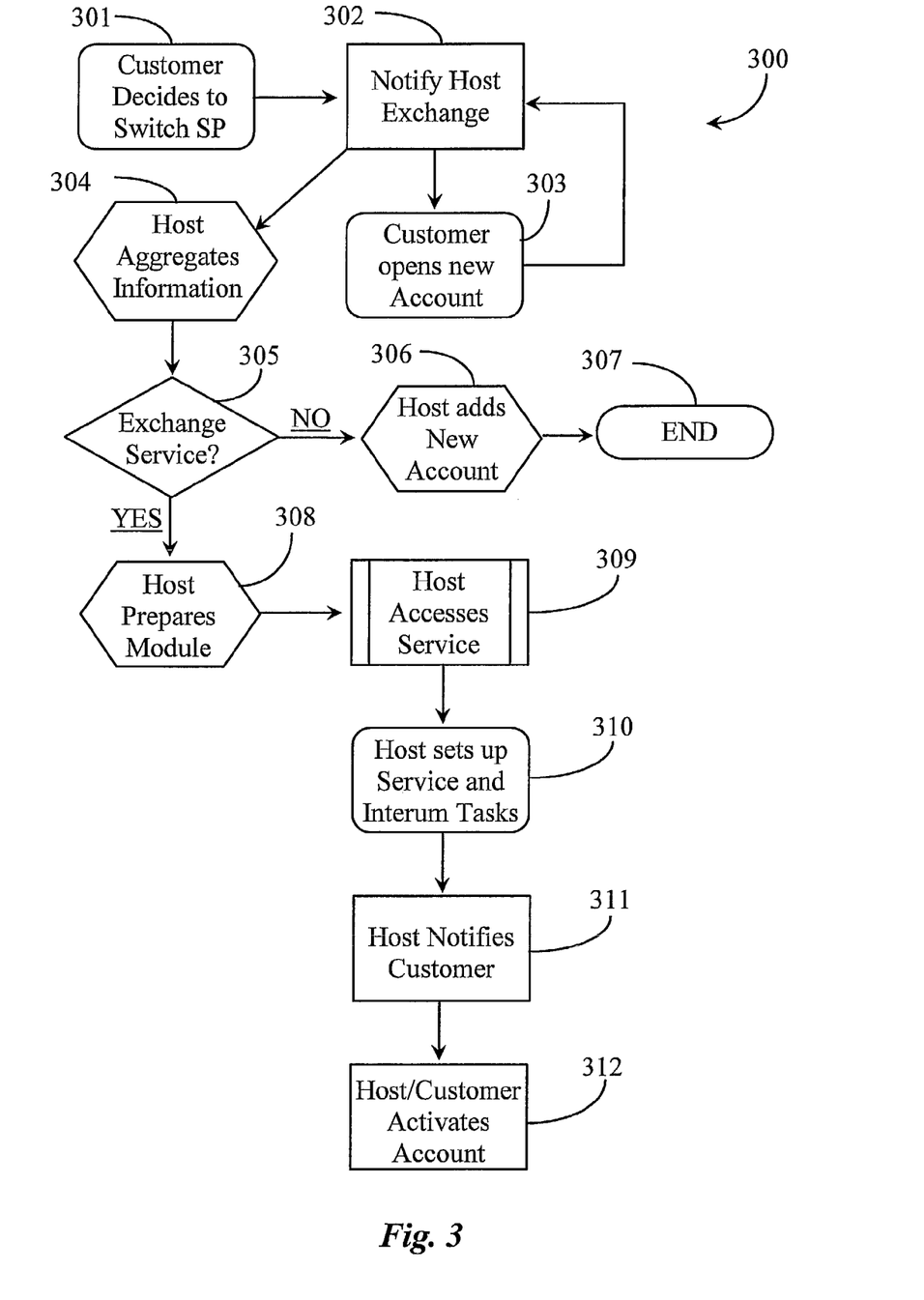
FIG. 3 is a process flow chart illustrating steps for practicing the invention.

FIG. 3 is a process flow chart illustrating steps 300 for practicing the invention. In step 301, a customer makes a decision to switch service providers (SP), which in the present example may be banking service providers. In the present example, the customer has an existing account with the first or original bank. The customer also has an account with the information aggregation and summary service that hosts the exchange service of the present invention. In this case, the information service analogous to facility 101 of FIG. 1 aided by functionality 105 of FIG. 1 has direct or indirect information about the customer account with the original bank. In the case of direct information, the information aggregator may have served as a proxy enabling the customer to perform banking tasks at the network access point of the information facility without requiring the customer to log-in to the customer access system provided by the bank. Also in this case, the information aggregator has the capability of logging into the bank system representing the customer including knowledge of all of the customer's activities at the bank.

At step 302, the customer notifies the host exchange service at the information aggregation facility of the move from the original service provider to a new service provider. In one embodiment, the information aggregation and summarization facility providing host exchange services may indirectly discover the planned switch from bank 1 to bank 2. Such a discovery might be made through the course of the normal business of aggregating and summarizing information for that customer. At step 303, the customer opens a new account at the new service provider (bank) in this example.

The scope of services the customer engaged in with the first bank may be minimally the maintenance of at least one debit account like a checking account. Additionally, other services might be involved in the switch like bill pay services the bank provided to the customer, among other investment and/or financial services. In one embodiment and logically speaking, the customer may have a design for continuing the same types of value added services like bill payment services at the new bank presuming those services are offered at the new bank.

Typically, when the customer opens the new account, the host exchange service provider is notified (302) and the customer might supply password information to the host exchange service and an account number if required. It is noted herein the information aggregation and summary service provider is the same provider of host exchange services, at least in this example. In one embodiment, the new banking service provider is already known to the host exchange system, albeit not directly through the particular customer providing notification of the new account, but through other customers that regularly bank there and are also customers of the information aggregation and summary service where the new bank is registered to that service. Therefore, the host exchange system already has information gathered about the bank, its services, the format used by the bank in billing and in other transactions, and the web structure or architecture used by the bank to provide it's network services. In one embodiment, if the new bank service is not already known to the host exchange service provider, the necessary information may be gathered by the service partly through customer-provided information and partly through other data mining capabilities including screen scraping.

In this embodiment, it is assumed that the new banking service provider is well known to the host exchange service provider. At step 304, the host exchange service provider begins collecting and aggregating data necessary to bring about a seamless transfer of services from the first bank to the second bank on behalf of the customer. A service exchange might be an exchange of one or more similar account services like a savings and checking account. In this example, the process deals with a more complicated bill payment service, but may also include set-up of certain new other services as well.

In step 304, the host may obtain all of the customer information data related to the old service account that will be closed at the old bank like full name, billing address, account transaction history, bill pay payee information, bill pay schedule information, and any information related to pending fees, pending transactions, and other current bank service information. The information retrieved may include payment schedules for each payee whether recurring payments or one-time payments.

The host exchange service provider already has information pertinent to the banks service procedures, electronic remittance forms, payer and payee forms, log-in procedures, activation procedures and navigation paths required to access services.

At step 305, it is determined if the customer will use the exchange service to set up a similar service or services with the new bank that the customer has in place at the old bank. At step 305, if no then at step 306, the host exchange service may add a new account for the customer that is added based on information the customer provided. At step 307, the process may end if the customer does not plan to migrate any services.

In a preferred embodiment of the invention, the host exchange service is able to set up a new service such as a bill pay service at the customer's new bank by leveraging data from the old service at the previous bank. In a preferred embodiment, the service also mitigates the transition so that current bill payment cycles are not interrupted.

Referring now back to FIG. 3 at step 305, if the customer desires to set up bill payment services at the new bank then at step 308, the host prepares a service account module that can be executed to establish the new service. Using the information leveraged from the old service, and information known about the new service provider, the host accesses the new bill pay service offered by the new service provider at step 309. In one embodiment, login information provided by the customer to the host exchange after opening an account at the new bank in step 303 is used to access the service to register the customer for bill payment services.

At step 310, the host sets up the service and performs any interim tasks required to establish the new service including registering all of the payees and establishing the amounts and payment dates for the customer's current bills. The new bill payment service is tied to the customer's new checking account or other account that can be electronically debited to fulfill the bill pay obligations of the customer. In this regard, the host may also have the ability to mitigate the transition of services between banks from a scheduling perspective. For example, the customer may have bills that become due during the transition between service providers. Other bills may not come due until well after the new service is activated. Therefore, the host may represent (emulate) the customer at both services automatically performing tasks that enable a smooth transition between service providers.

The host may specify that certain payments be left for the old account leaving the necessary funds in the old account. The payments that will not be interrupted by the transition between accounts may be made from the customer's new banking account.

At step 311, the host may notify the customer that the new bill payment services are set-up and ready to use. In one embodiment, there may be some activation required before the bank begins the actual service. In one embodiment, the customer may confirm the new service. In another embodiment, the host may perform the activation emulating the customer. The host exchange service of the present invention may enable a customer switching bill payment services from one bank to another to greatly reduce or eliminate the tasks of manually logging on and configuring the service. The host exchange service is able to convert data formats and form protocols from the old formats and forms used at the old service to the formats and forms used at the new service. After the new service is established and running, the old service data, navigation templates, etc, can be purged from the customer's account at the host.

As described further above, the host exchange application is able to convert data formats and form protocols used by the old service into data formats and form protocols required by the new service. In some embodiments where the customer is required to perform a visual authentication such as, for example typing a series of characters viewed in a security graphic, the host exchange may notify the customer of the requirement and may enable the customer to perform the authentication by proxy.

One with skill in the art of information collection aggregation and summary services will appreciate that the method of establishing the new service or services for the customer may very somewhat dependant on generic service requirements at each institution. Likewise, the actual involvement require of the customer in establishing and activating the new service may also very somewhat without departing from the spirit and scope of the present invention.

Figure 4:
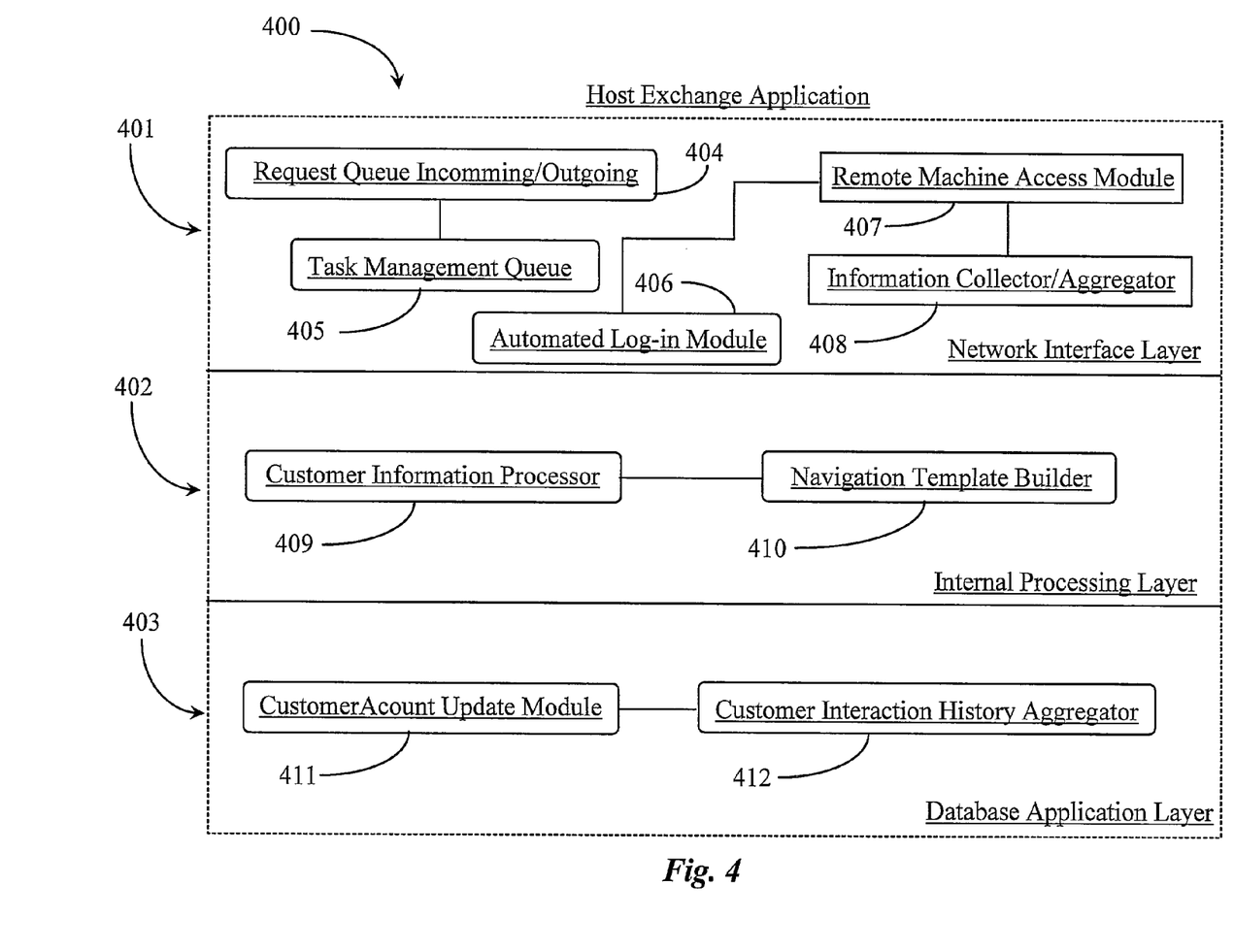
FIG. 4 is a block diagram illustrating components of a host exchange application according to an embodiment off the present invention.

FIG. 4 is a block diagram illustrating components of a host exchange application 400 according to an embodiment off the present invention. Host exchange application 400 includes, in this example, a network interfacing layer 401, an internal processing layer 402, and a database application layer 403. Network interface layer 401 is adapted to forge the actual network connections with the old and new service providers of the customer on behalf of the customer. Layer 401 has a request queue (incoming/outgoing) 404 adapted to receive customer notifications and/or requests and to queue up notifications and requests sent to customers. Layer 401 has a task management queue, in this example that is adapted to contain pending tasks that the application will perform on behalf of customers. Tasks may include registering new accounts, finalizing old accounts, and mitigating transition schedules in some embodiments (transition management).

Layer 401 includes an automated login module that may be used in conjunction with a navigation template or may be built into a navigation template in order to login to a service site or web page emulating the customer. In this example, application 401 includes a remote machine access module 407 adapted to enable the service to access certain information by permission of the customer and/or the institution in one embodiment. In other embodiments, a remote access module is not required where the information is accessible by password information known to the service.

Layer 408 includes an information collector and aggregator module 408 adapted to collect information from service providers including but not limited to data formats used, electronic form and registration orders and protocols. Information collector and aggregator 408 may also collect navigation path information, payee forms information (bill payment services), and other more generic information that the host needs to operate successfully at the service provider sites patronized by the customers.

Layer 402 is adapted to process data internally and to produce executable instances of navigation and task performance modules that are used to perform tasks for the customer. Layer 402 includes a customer information processor 409 adapted in this embodiment to process data related to the customer's old service that is being closed, including processing of other customer data as required like account history, bill payment transaction history including transaction amounts, transaction dates, and payee data.

Layer 402 may include a navigation template builder 410 that is adapted to build navigation templates for navigating to customer services and for performing tasks at those sites supporting those services. In one embodiment, navigation templates are built from scratch in the case that a provider is new to the host exchange service. In other cases, the basic templates may already exist for navigation and task performance whereby the customer information applied to those templates is the only variable.

Layer 403 is adapted to interface with the data stores of the host including those data stores that hold any information about the customer and any services the customer may currently have registered with the host such as may be the case with other data aggregation and summary services. Layer 403 includes an account update module 411 adapted to update customer account information with any new data that becomes available.

Layer 412 may also include a customer interaction history aggregator 412 that is adapted to aggregate specific customer interaction histories known to the host or that have become available to the host via login to a service provider registered with the host as a customer service provider of a customer. For example, payees of a bill payment service may maintain payment histories of payments made to them over time by the customer. Such histories may be included in information collected by the host exchange service relative to a first service provider's bill payment service. Layers 401, 402, and 403 work in integrated fashion to bring about successful transition of a service type form one service provider to another for a customer that has authorized and desires the transition.

As described further above, it is possible that the customer has not notified the host exchange service of the invention that the customer is about to change service providers. In such as case, the host exchange service may "discover" that a customer may be making a service provider change through normal services performed for the customer related to the first service provider already registered with the data aggregation and summary services. For example, a transaction history for a customer checking account at the original service provider may indicate a transaction related to closing out an account and/or opening a new account at a new service provider. The host exchange may be aware that the customer uses bill payment services provided by the first service provider and that a similar service is available at the second service provider the customer is switching to.

Whether the customer has made a decision to continue bill payment services at the new provider may not be known, however, in one embodiment, the host exchange service may pre-aggregate much of the required data to transition services and then build an interactive module that contains an offer to transition between the similar services. The module can be presented within the customer's personalized information summary page, perhaps in the financial information section of the customer's personalized summary page. A generic message or pitch might be presented such as "If you are switching services, let us help". "Click here to learn more."

The new service provider may already be well known to the host through other customers that have registered the service with the host, or through tangential data aggregation and summary services performed by the host entity relative to the new provider. For example, both Bank of America and Wells Fargo Bank may be well known to the host exchange service. Therefore a customer switching from one to the other, where the other is the new provider, really does not have to provide much information at all that the host exchange cannot retrieve from its own data stores.

There may be more or fewer modules provided within application 400 without departing from the spirit and scope of the present invention. In one embodiment, the host exchange services are part of a larger package of services offered by a data aggregator and data summary presenter. Instances of data collector, data aggregator, and file, form, and data format converters may be available to the host exchange application but may not be an integrated piece of the application. Application 400 generally handles the transitions from one account to another and ensures all of the correct data from the first service account is seamlessly transferred to the new account.

One with skill in the art will recognize that the methods and apparatus of the present invention are not limited to bill payment services per say, but may apply to many other service types. Services that are provided more or less in a similar way by different service providers are good examples of services that the host exchange system can mitigate transition of for a customer. For example, Internet service providers offering network access services to customers represent the type of service providers subject to moderate or even frequent customer transition. Mobile telephone service providers also see a high rate of customer transition.

In different applications, the host exchange service can be used to transition banking account or investment account services, email account services, bill payment services, and other services that can be established accessed over the network.

It will be apparent to a person with skill in the art that many alterations may be made in the descriptions of embodiments above within the spirit and scope of the present invention. Software, for example, may be implemented in many different ways to accomplish essentially the same functionality. Therefore the invention is limited only by the scope of the claims that follow:

What is claimed is:

1. A system for exchanging accounts, comprising:
   a network-connected server mining information for clients from network sites; and
   software executing on the network-connected server from a coupled machine-readable medium, including a portion mining the information for clients from network sites, and a portion providing account exchange functions;
   wherein, in the process of data mining for a client, the system discovers that a client has initiated a transaction to close an account at one financial institution and open an account at another financial institution, and then solicits the client to subscribe to a service assisting the client with the task of switching service accounts and account data between the accounts.

2. The system of claim 1 wherein, in the process of switching accounts, bill payment services are configured for the client at the second financial institution using data from a bill payment service at the first financial institution.

3. The system of claim 1 wherein the network is the Internet network.

4. The system of claim 1 wherein the accounts are checking or savings accounts.

5. The system of claim 1 wherein the financial institutions are commercial banks.

6. The system of claim 2 wherein the information mined includes information about payees registered by the subscriber at the first financial institution.

7. The system of claim 6 wherein the payee information includes subscriber data at the payee site including though not limited to account number, remittance address, and user authentication data.

8. The system of claim 2 wherein the information includes payment schedules for each payee whether recurring payments or one-time payments.

9. The system of claim 2 wherein the information includes data defining e-bills presented by any of the payees to the customer, the data including form stricture and format.

10. The system of claim 2 wherein the information includes data describing presentment protocols for any of the payees of the customer.

11. The system of claim 2 wherein the information includes data describing the payment histories of the customer relative to any or all of the payees of the customer.

12. The method of claim 1 wherein the network is the Internet network.

13. The method of claim 1 wherein the accounts are checking or savings accounts.

14. The method of claim 1 wherein the financial institutions are commercial banks.

15. A method for exchanging accounts, comprising the steps of:
   (a) mining information for clients from network sites using a network-connected server;
   (b) discovering, in the process of information mining for a client, that the client has initiated a transaction to close an account at one financial institution and open an account at another financial institution; and
   (c) soliciting the client to subscribe to a service assisting the client with the task of switching service accounts and account data between the accounts.

16. The method of claim 15 including a step for configuring bill payment for the client at the second financial institution using data from a bill payment service at the first financial institution.

17. The method of claim 16 wherein the information mined includes information about payees registered by the subscriber at the first financial institution.

18. The method of claim 16 wherein the payee information includes subscriber data at the payee site including though not limited to account number, remittance address, and user authentication data.

19. The method of claim 16 wherein the information includes payment schedules for each payee whether recurring payments or one-time payments.

20. The method of claim 16 wherein the information includes data defining e-bills presented by any of the payees to the customer, the data including form structure and format.

21. The method of claim 16 wherein the information includes data describing presentment protocols for any of the payees of the customer.

22. The method of claim 16 wherein the information includes data describing the payment histories of the customer relative to any or all of the payees of the customer.

* * * * *